(12) United States Patent
Borg et al.

(10) Patent No.: US 9,022,339 B2
(45) Date of Patent: May 5, 2015

(54) CABLING FOR CENTRAL AXIS PENDANT SYSTEM

(71) Applicant: OASYS Healthcare Corporation, Uxbridge, Ontario (CA)

(72) Inventors: Vincent A. Borg, Uxbridge (CA); David Stinson, Uxbridge (CA)

(73) Assignee: OASYS Healthcare Corporation, Uxbridge (CA)

( * ) Notice: Subject to any disclaimer, the term of this patent is extended or adjusted under 35 U.S.C. 154(b) by 20 days.

(21) Appl. No.: 14/077,551

(22) Filed: Nov. 12, 2013

(65) Prior Publication Data

US 2014/0131526 A1    May 15, 2014

Related U.S. Application Data

(60) Provisional application No. 61/725,082, filed on Nov. 12, 2012.

(51) Int. Cl.

| | |
|---|---|
| *A47H 1/10* | (2006.01) |
| *H02G 7/05* | (2006.01) |
| *H02G 3/04* | (2006.01) |
| *B42F 13/00* | (2006.01) |
| *A61G 13/00* | (2006.01) |
| *F21V 13/00* | (2006.01) |
| *B60Q 1/06* | (2006.01) |
| *F21V 21/00* | (2006.01) |
| *F21V 19/00* | (2006.01) |
| *F21V 33/00* | (2006.01) |

(52) U.S. Cl.
CPC . *H02G 7/05* (2013.01); *F21V 33/00* (2013.01); *H02G 3/0493* (2013.01)

(58) Field of Classification Search
USPC .............. 248/639, 317, 324, 343; 362/33, 35, 362/147, 405, 804
See application file for complete search history.

(56) References Cited

U.S. PATENT DOCUMENTS

| | | | | |
|---|---|---|---|---|
| 1,050,828 | A | * | 1/1913 | Hendrickson .................... 82/132 |
| 3,240,925 | A | * | 3/1966 | Paschke et al. .................. 362/33 |
| 3,356,357 | A | * | 12/1967 | Levine .......................... 267/150 |
| 3,505,884 | A | * | 4/1970 | Ford et al. ...................... 74/10.2 |
| 3,584,793 | A |   | 6/1971 | Ilzig et al. |
| 4,082,244 | A |   | 4/1978 | Groff |
| 4,160,536 | A |   | 7/1979 | Krogsrud |
| 4,751,986 | A | * | 6/1988 | Takahashi ........................ 188/85 |
| 5,808,680 | A |   | 9/1998 | Steckhan |

(Continued)

FOREIGN PATENT DOCUMENTS

| | | |
|---|---|---|
| DE | 8913757 U1 | 3/1991 |
| DE | 19526632 B4 | 1/1997 |

(Continued)

*Primary Examiner* — Jonathan Liu
*Assistant Examiner* — Taylor Morris
(74) *Attorney, Agent, or Firm* — Jonathan M. D'Silva; Bryan L. Walker; MacDonald, Illig, Jones & Britton LLP (57) ABSTRACT

A central pivot pendant arm system is provided for running cabling internally within a shoulder casting through a shaft that provides an axis of rotation and cabling access through a side opening in the shaft. The shoulder casting is pivotable about the axis of rotation and partially encloses a portion of the shaft. The shoulder casting has a protrusion for attachment of a pendant arm and facilitates cabling passage inside the shoulder casting, between the shaft side opening and the pendant arm interior.

14 Claims, 8 Drawing Sheets

(56) References Cited

U.S. PATENT DOCUMENTS

| | | |
|---|---|---|
| 6,012,821 A | 1/2000 | Yeaney et al. |
| 6,030,103 A | 2/2000 | Gampe et al. |
| 6,164,612 A | 12/2000 | Schmitt |
| 6,261,023 B1 | 7/2001 | Schmitt et al. |
| 6,431,515 B1 | 8/2002 | Gampe et al. |
| 6,793,380 B2 | 9/2004 | Kupfer |
| 6,817,585 B2 | 11/2004 | Wagner et al. |
| 6,854,866 B1 * | 2/2005 | Liang .................. 362/399 |
| 7,726,823 B2 * | 6/2010 | Rus et al. .................. 362/33 |
| 2003/0160142 A1 | 8/2003 | Brahler et al. |
| 2004/0188578 A1 | 9/2004 | Turner |
| 2005/0242261 A1 | 11/2005 | Brahler et al. |
| 2009/0213596 A1 | 8/2009 | Gull et al. |
| 2011/0079697 A1 * | 4/2011 | Muller et al. .................. 248/323 |
| 2012/0228454 A1 | 9/2012 | Kroenung |

FOREIGN PATENT DOCUMENTS

| | | |
|---|---|---|
| DE | 10235343 A1 | 2/2004 |
| WO | 2012095323 A1 | 7/2012 |

* cited by examiner

CABLING FOR CENTRAL AXIS PENDANT SYSTEM

BACKGROUND

Pendant arm systems are used in healthcare facilities to provide stable suspended equipment platforms. Pendant arm systems are often suspended from ceilings walls to provide maximum equipment access without cluttering floor space. Pendant arm systems typically have a central pivot that has independently rotatable shoulder castings, to which pendant arms modularly attach. Wiring is usually run from a wall or ceiling to the equipment, where such wiring can be used to deliver power, control, or audio/video signals. Previous pendant arm systems have run their cabling externally to the shoulder castings.

SUMMARY

A central pivot pendant arm system is provided comprising a shaft that provides an axis of rotation and cabling access through a side opening in the shaft. A shoulder casting that is pivotable about the axis of rotation partially encloses a portion of the shaft. The shoulder casting has a protrusion for attachment of a pendant arm and facilitates cabling passage inside the shoulder casting between the side opening and the pendant arm interior.

In variations of the central pivot pendant arm system, the shaft could incorporate a stop extending outward from the shaft to block the path of rotation of a tab extending inward from the shoulder casting. In some embodiments, the shoulder casting could also include a divider that radially extends from the shaft to the shoulder casting. In other embodiments, the pendant arm can be secured to the protrusion by a joining mechanism.

In other variations of the central pivot pendant arm system, a slip ring inside the shoulder casting is rotatable about the shaft and interfaces with the pendant arm. In some embodiments, the shaft can also be mounted according to one of four quadrants about the axis of rotation.

In some embodiments of the central pivot pendant arm system, the shaft can provide cabling access through the side opening and a first opening. Alternatively, the shaft can provide cabling access through the side opening and an endpoint opening.

In other variations of the central pivot pendant arm system, the protrusion includes a removable cover. In some embodiments, the central pivot pendant arm system can have a plurality of stacked shoulder castings. In still other embodiments, a shaft portion comprises a plurality of side openings separated by a divider radially extending from the shaft portion to the shoulder casting, wherein cabling can run between each of the plurality of side openings and the pendant arm interior.

Other variations of the central pivot pendant arm system can include a plurality of side openings on the shaft, and a plurality of stacked shoulder castings, with each shoulder casting partially enclosing a portion of the shaft having one of the side openings.

In another embodiment, the central pivot pendant arm system comprises a shaft providing an axis of rotation and cabling access through a plurality of side openings. The system has a plurality of stacked shoulder castings that are pivotable about the axis of rotation. Each shoulder casting partially encloses a portion of the shaft having one of the side openings and comprising a protrusion for attachment of a pendant arm. Each pendant arm proximally attaches to one of the protrusions, with each pendant arm distally attaching to a pivot joint. For each shoulder casting, cabling extends from the side opening, through the shoulder casting interior, and through the pendant arm interior.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Conventional pendant arm systems have had substantial limitations in the manner that they run cabling to attached pendant arms. One approach has been to simply leave the cabling exposed to view near the shoulder casting. In addition to aesthetic considerations, this approach leaves the exposed cabling at considerable risk for damage from the surrounding environment. An alternate approach has been to use separate, external covers to conceal the exposed cabling. Such external covers add to the cost, complexity, and maintenance of pendant arm systems. Additionally, when there are more than two stacked shoulder castings, existing pendant arm systems only run cabling for the top and bottom shoulder castings, and not the shoulder castings in the middle.

However, running cabling internally within the shoulder castings of a pendant arm system is possible with the embodiments depicted herein, without the need for external cabling covers. In one embodiment, shown in FIG. 1, a central pivot pendant arm system 10 comprises at least one shoulder casting 12 connected to a mounting device 44 via a connector 46, all of which cabling 40 can directly pass through. The mounting device 44 can be attached to a variety of surfaces, for example, ceilings, walls, floors, suspended structures, etc. Each shoulder casting 12 has a protrusion 16 that can contain a removable cover 18. The removable cover 18 can provide convenient access to cabling 40 that runs through the protrusion 16. Such access can be used for cabling installation, maintenance, troubleshooting, removal, and/or to utilize connectors for modular cabling extension, for example.

Figure 1:
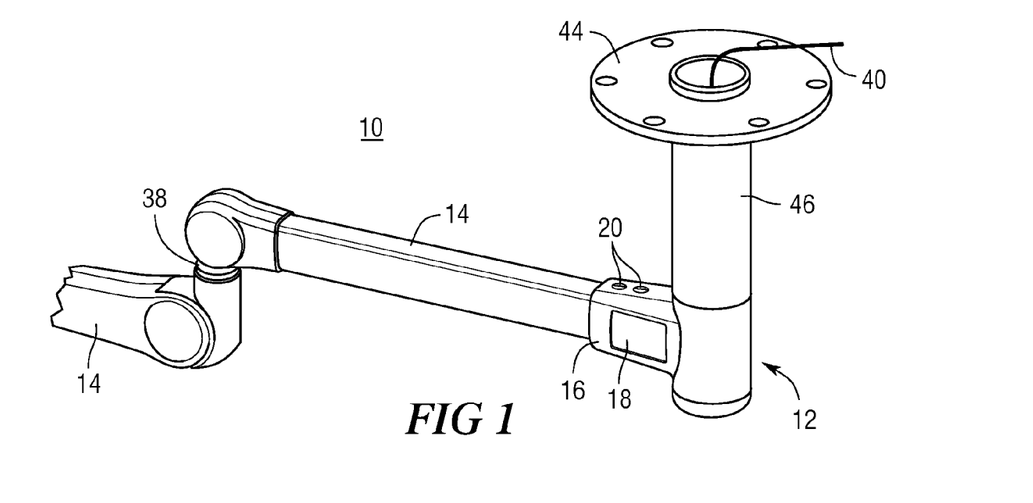
FIG. 1 is a perspective view of a central pivot pendant arm system with one shoulder casting.

Two fasteners 20 are shown as a joining mechanism to attach the pendant arm 14 to the shoulder casting 12, although any number and any type (screw, bolt, rivet, etc.) of fasteners 20 are possible. At the distal end of each pendant arm 14, a pivot joint 38 can be attached and provide passage for the cabling 40. It will be understood that the pivot joint 38 is fully connected (either directly or through another pendant arm 14) to technical equipment that requires cabling 40 to be functional, such as monitors, TVs, healthcare equipment, lighting, robotics, computers, diagnostic equipment, etc. It will also be understood that such technical equipment could be attached at the distal end of the pendant arm 14 attached to the protrusion 16, instead of at the pivot joint 38 shown.

Figure 1A:
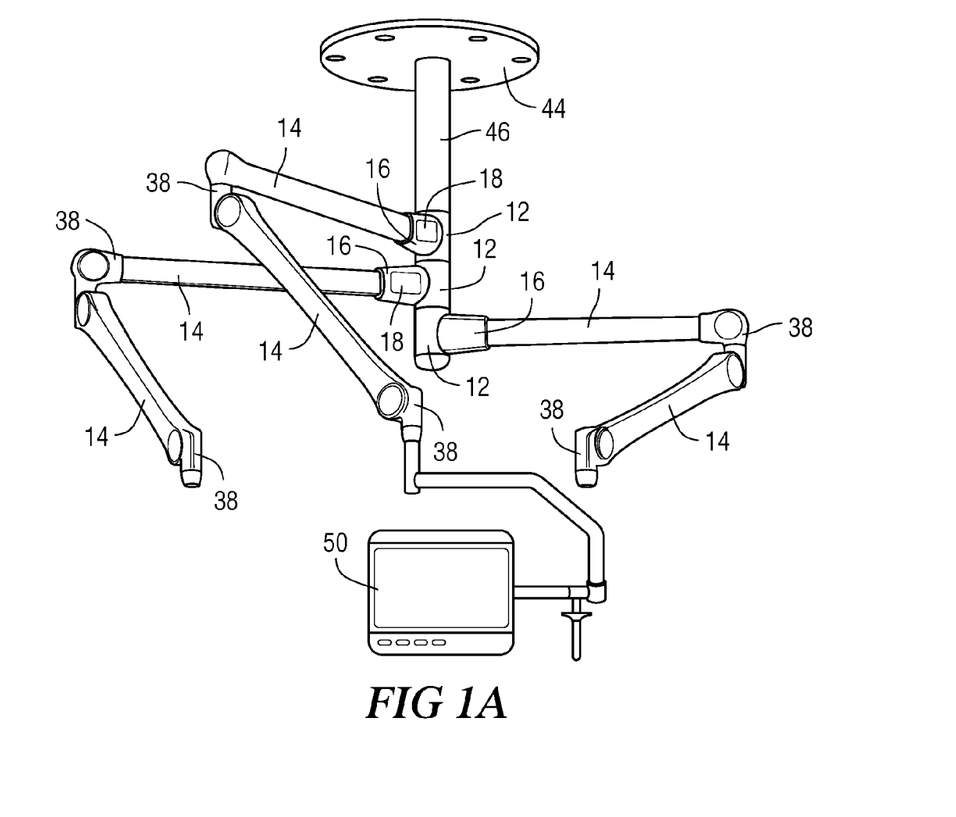
FIG. 1A is a side view of a central pivot pendant arm system with three shoulder castings.
Figure 1B:
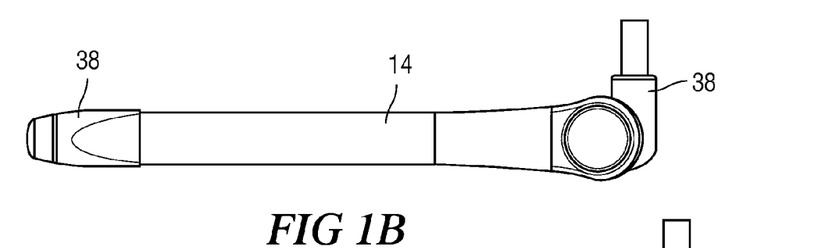
FIG. 1B is a side view of a pendant arm variation.
Figure 1C:
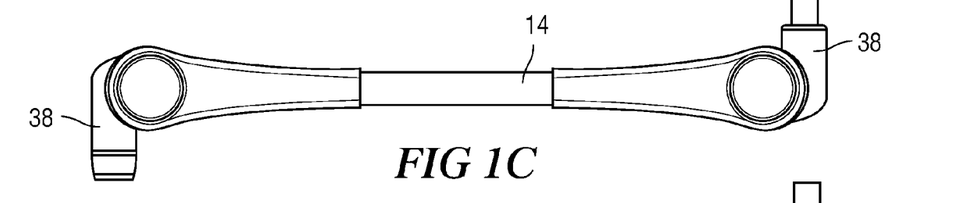
FIG. 1C is a side view of a pendant arm variation.
Figure 1D:
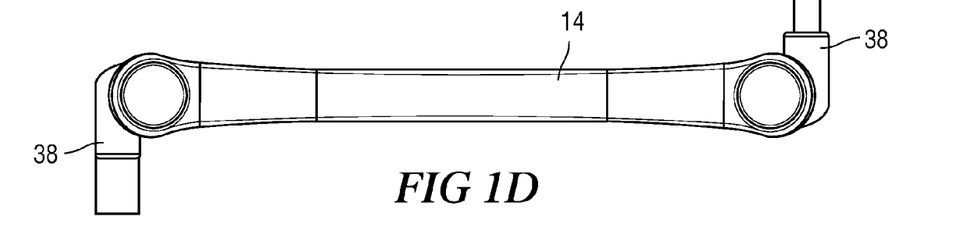
FIG. 1D is a side view of a pendant arm variation.

It will be understood that central pivot pendant arm systems discussed herein are not limited to the single arm variant depicted in FIG. 1. For example, FIG. 1A shows a side view of a central pivot pendant arm system 10 having three shoulder castings 12. Attached to the protrusion 16 of each shoulder casting 12 is a pendant arm 14 having a pivot joint 38 attached at its distal end. Each pivot joint 38 has another pendant arm 14 attached, which has another pivot joint 38 attached at its distal end. Attached to one pivot joint 38 is technical equipment 50, shown herein as a monitor. As will be discussed in more detail below, the cabling 40 required by technical equipment 50 internally traverses the entire central pivot pendant arm system 10. In addition, the types of pendant arms 14 used in the central pivot pendant arm system 10 may be of any appropriate type of pendant arm, such as those depicted in FIG. 1B, FIG. 1C, and FIG. 1D.

Figure 2:
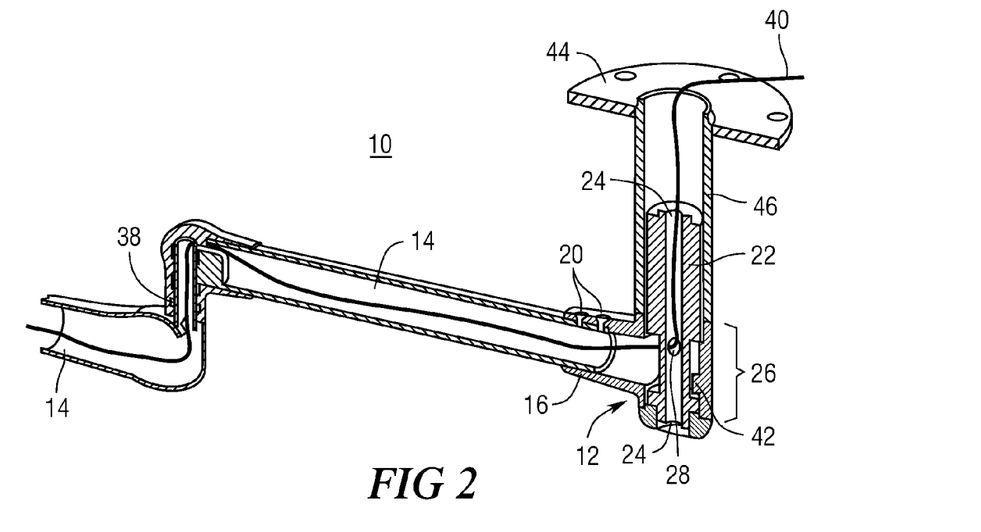
FIG. 2 is a side cross-section perspective view of the central pivot pendant arm system of FIG. 1.

FIG. 2 shows a side cross-section view of the central pivot pendant arm system 10 of FIG. 1. The shoulder casting 12 independently rotates (in any direction) about the shaft 22, which serves as the axis of rotation for the shoulder casting 12. The shaft 22 as depicted has two endpoint openings 24, located at the top and bottom of the shaft 22, with cabling 40 entering the shaft only through the endpoint opening 24 at the top of the shaft 22. Cabling 40 entry is possible through either, or both, of the depicted endpoint openings 24. Other embodiments may include a shaft 22 having only a single endpoint opening 24. Each shoulder casting 12 partially encloses a shaft portion 26. Each shaft portion 26 can contain at least one side opening 28 through which cabling 40 can pass. The shaft 22 can extend into the connector 46.

A tab 42 (discussed in more detail below for FIG. 5) extends toward the shaft portion 26 from an area of the interior of the shoulder casting 12 that surrounds the shaft portion 26. Cabling 40 running through the connector 46 can enter the top opening 24, run through the shaft 22, emerge from the side opening 28 into the shoulder casting 12, pass through the protrusion 16 to travel through the attached pendant arm 14, and enter inside the pivot joint 38. The shaft 22 can have four 90-degree mountable positions with respect to the axis of rotation. In other embodiments, however, the shaft 22 can be mounted in any number of possible positions with respect to the axis of rotation. It will be understood that any components depicted in FIG. 2 can utilize any suitable materials, shapes, sizes, and proportions.

Figure 3A:
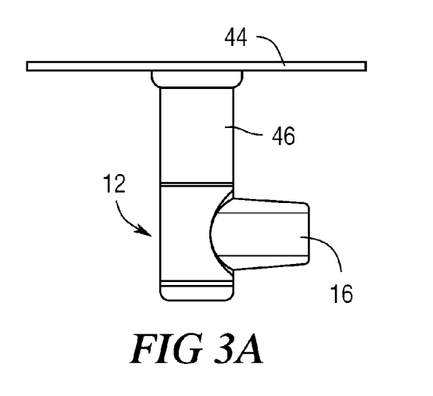
FIG. 3A is a side view of the central pivot pendant arm system of FIG. 1.
Figure 3B:
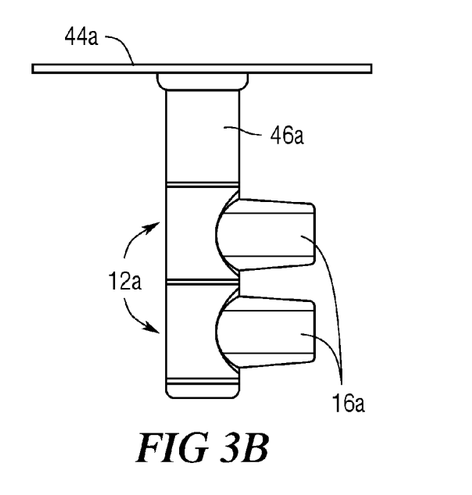
FIG. 3B is a side view of a different embodiment of the central pivot pendant arm system having two shoulder castings.
Figure 3C:
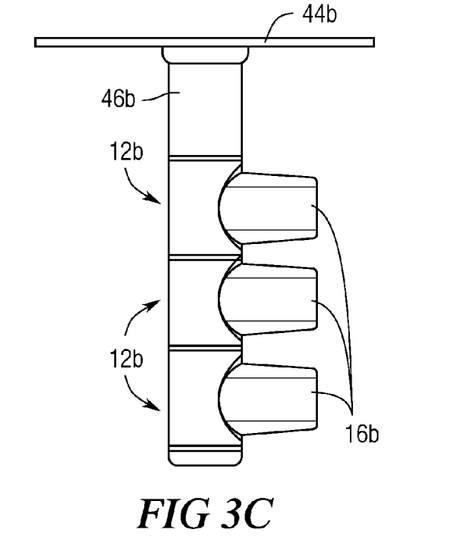
FIG. 3C is a side view of a different embodiment of the central pivot pendant arm system with three shoulder castings.
Figure 3D:
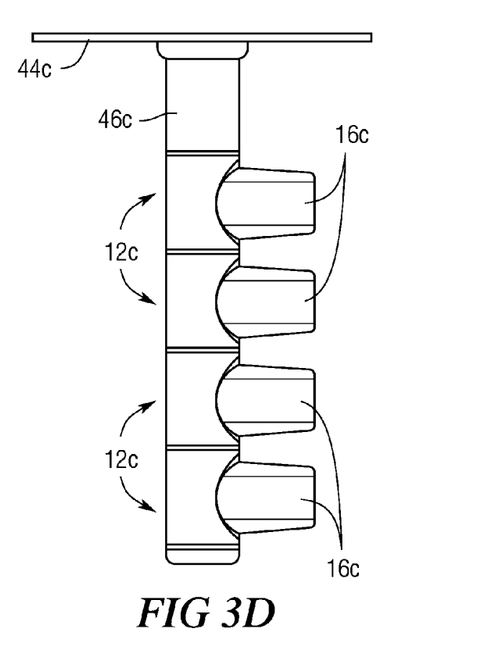
FIG. 3D is a side view of a different embodiment of the central pivot pendant arm system with four shoulder castings.

FIG. 3A shows a side view of the central pivot pendant arm system of FIGS. 1-2 without a pendant arm. Cabling (not shown) is run from the mounting device 44, through the connector 46, and into the shoulder casting 12, where it can exit through the protrusion 16. The central pivot pendant arm system can support any number of shoulder castings 12. For example, FIGS. 3B-3D depict side views of embodiments utilizing increasing numbers of vertically stacked shoulder castings 12(a-c). In each of these embodiments, there can be a plurality of cabling (not shown) passing through the connector 46(a-c), wherein each shoulder casting 12(a-c) can have separate cabling passing through in order to exit through its protrusion 16(a-c).

Figure 4:
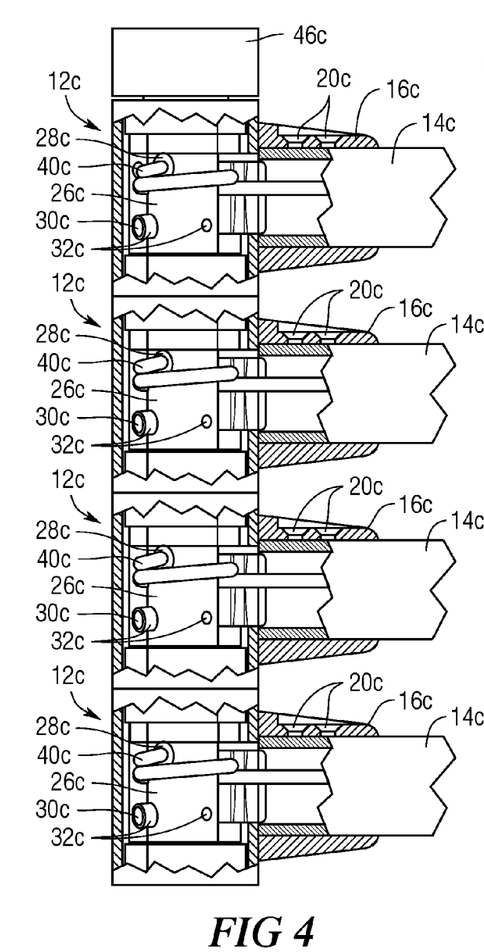
FIG. 4 is a vertical cross-section view of a central pivot pendant arm system of FIG. 3D.

FIG. 4 shows a vertical cross-section of the embodiment of FIG. 3D having four shoulder castings. For each shoulder casting 12c, cabling 40c passes through the side opening 28c, wraps around the shaft portion 26c, and enters the protrusion 16c. Each shaft portion 26c has threaded openings 32c for a cable stop 30c that limits the rotation of the shoulder casting 12c, as discussed in detail below with respect to FIG. 5. Multiple stacked pendant arms (not shown) are possible, with the cabling 40c for each being completely hidden from view within the shaft 22c and the shoulder castings 12c.

Figure 4A:
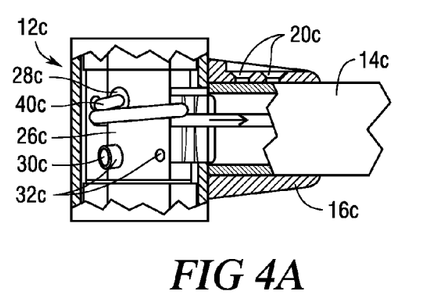
FIG. 4A is a vertical cross-section view of one of the shoulder castings of FIG. 3D with cabling wound around the shaft.
Figure 4B:
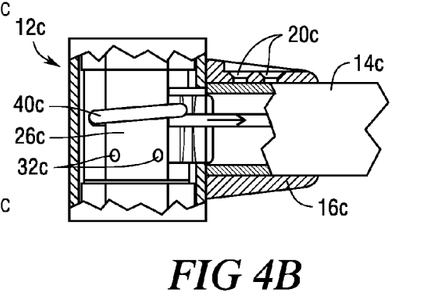
FIG. 4B is a vertical cross-section view of one of the shoulder castings of FIG. 3D with cabling unwinding around the shaft.
Figure 4C:
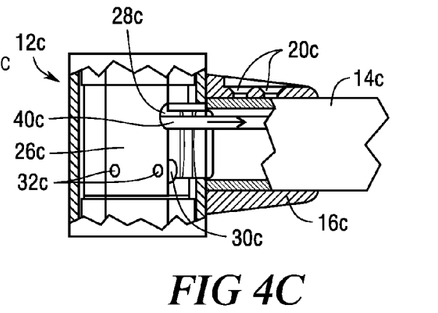
FIG. 4C is a vertical cross-section view of one of the shoulder castings of FIG. 3D with unwound cabling.

FIGS. 4A-4C show a range of motion for one of the shoulder castings 12c of FIG. 4 as it rotates about a stationary shaft portion 26c. Rather than depicting the shaft portion 26c as rotating, these figures instead show an orbiting viewpoint of the stationary shaft portion 26c, relative to the rotational movement of the shoulder casting 12c. FIG. 4A shows cabling 40c wrapped around the stationary shaft portion 26c. FIG. 4B depicts, based upon rotation of the shoulder casting 12c about the shaft portion 26c, the cabling 40c unwinding as it runs from the side opening (not shown) and enters the protrusion 16c. FIG. 4C shows the cabling 40c unwound as it runs from the side opening 28c directly through the protrusion 16c.

Figure 5:
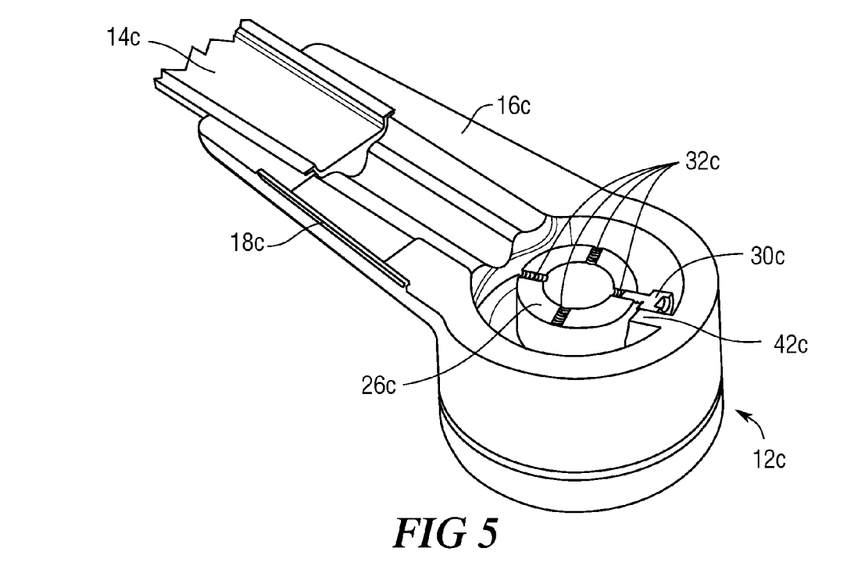
FIG. 5 is a horizontal cross-section perspective view of one of the shoulder castings of FIG. 3D.

FIG. 5 depicts a perspective view of a horizontal cross-section of the shoulder casting 12c from the embodiment of FIG. 3D. Each shoulder casting has a tab 42c that extends inward from the interior of the shoulder casting 12c towards the shaft portion 26c. Each shaft portion 26c has a cable stop 30c that blocks the rotational path of the tab 42c, thereby limiting the rotation of the shoulder casting 12c, based on the location of the cable stop 30c. This embodiment utilizes four threaded openings 32c in each shaft portion 26c, into each of which a cable stop 30c can be inserted. It should be understood that more than one cable stop 30c can be installed into each shaft portion 26c to reduce the range of rotation of the shoulder casting 12c by utilizing the plurality of the threaded openings 32c in the shaft portion 26c. The cable stop 30c depicted utilizes a rounded screw, but can be any type (and shape) of suitable threaded fastener (screw, bolt, rivet, etc.) that can be inserted into the threaded openings 32c. Four threaded openings 32c are visible (one being occupied by the cable stop 30c), but any number are possible.

Figure 6:
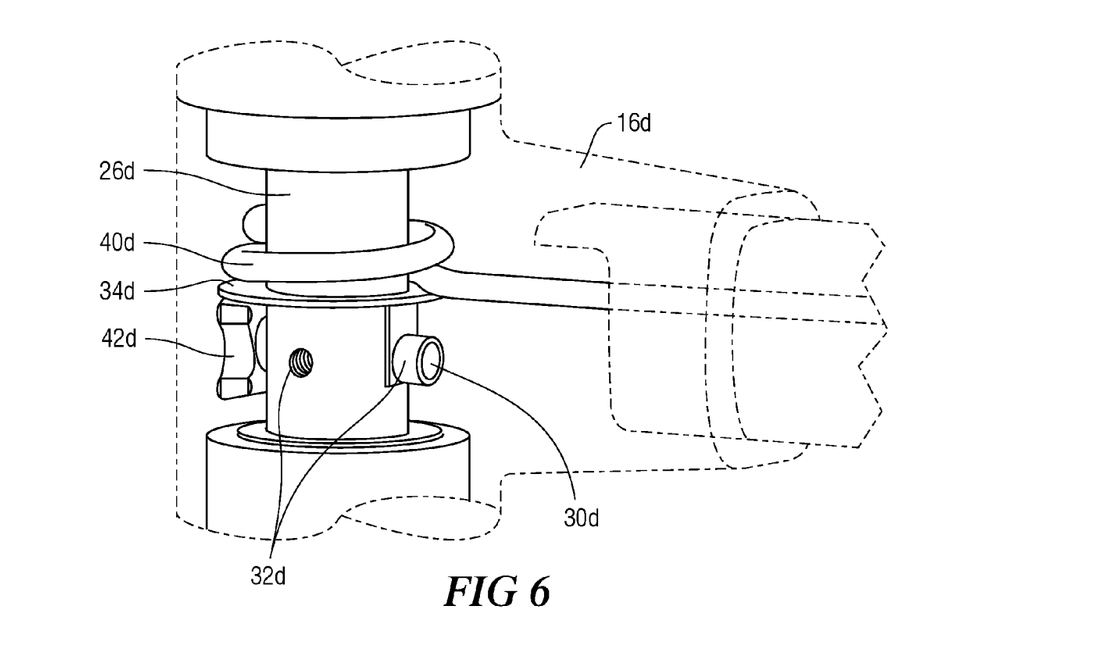
FIG. 6 depicts a close-up interior view of a shoulder casting in a different embodiment of the central pivot pendant arm system utilizing a divider.

FIG. 6 depicts another embodiment, showing an interior side-view of the shoulder casting. A divider 34d bisects the shaft portion 26d, between the cabling 40d emerging from the side opening (not shown), and the cable stop 30d. The divider 34d provides separation in the shoulder casting 12d between the cabling 40d and the cable stop 30d. This can separation can help prevent both harm to the cabling 40d as well as interference with the rotation of the shoulder casting 12d.

Figure 7:
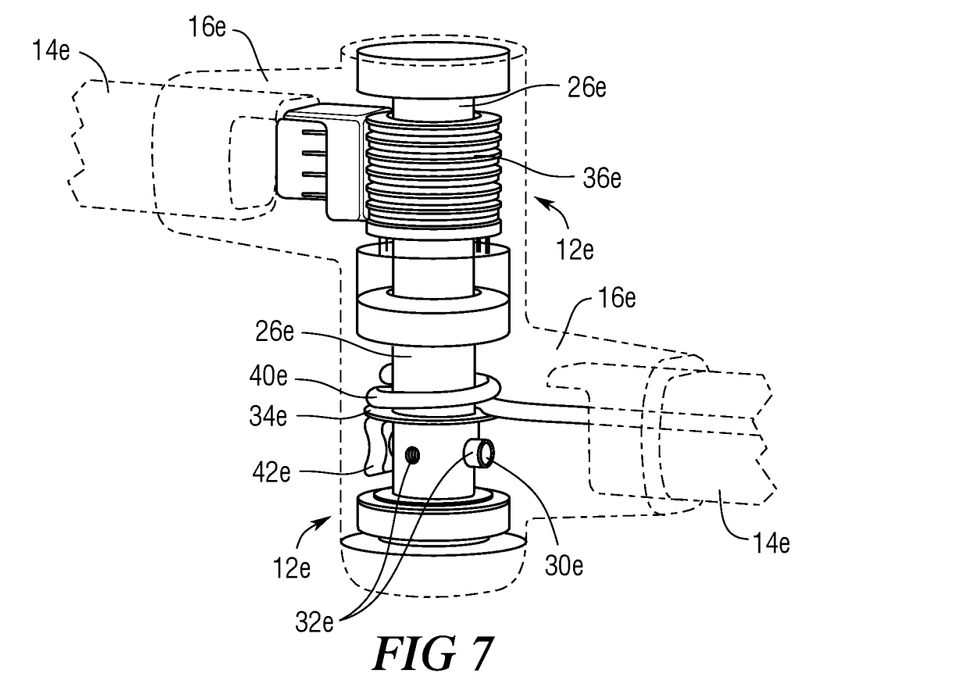
FIG. 7 is a side interior view of a different embodiment of a central pivot pendant arm system with two shoulder castings utilizing a slip ring inside the top shoulder casting and a cable pull in the bottom shoulder casting.

It will be understood that there are various ways to provide a continuous, internal electronic connection through a central pivot pendant arm system 10. It is even possible to combine different types of cabling connections within the same central pivot pendant arm system 10. This may be done because different technical equipment 50 can have different cabling requirements. FIG. 7 shows a central pivot pendant arm system 10 with two shoulder castings 12e, each with a different type of cabling connection. The top shoulder casting 12e utilizes a slip ring 36e that rotates about the shaft portion 26e inside the top shoulder casting 12e. The slip ring 36e can interface with cabling inside the top shaft portion 26e to bridge a connection to cabling (not shown) in the attached pendant arm 14e. The bottom shoulder casting 12e has a cabling 40e as described in other embodiments discussed above. Each shoulder casting 12e can utilize either a slip ring 36e or cabling 40e.

Figure 8:
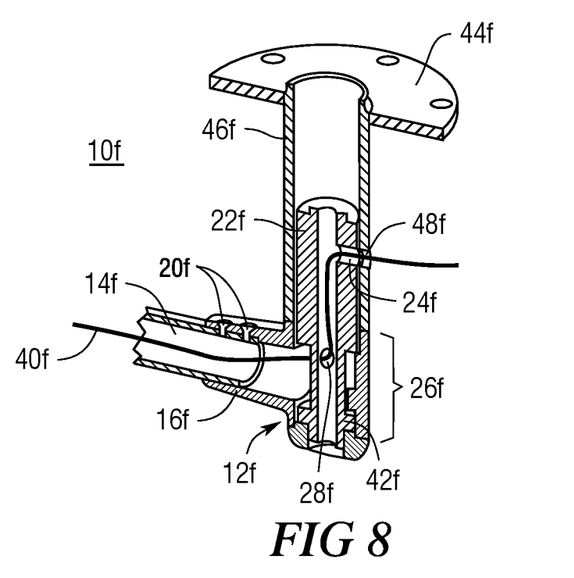
FIG. 8 is a side cross-section perspective view of an alternate embodiment of the central pivot pendant arm system having side openings on a connector and a shaft.

It will be further understood that the entry-point for the cabling 40f need not be limited to the top or bottom of the shaft 22f. FIG. 8 demonstrates this with a different embodiment. Here, cabling 40f enters a first opening 24f in the shaft 22f through a connector side opening 48f. The connector side opening 48f can be located anywhere on the connector 46f. The first opening 24f can be located on any part on the shaft 22f that is inside the connector 46f.

Figure 9:
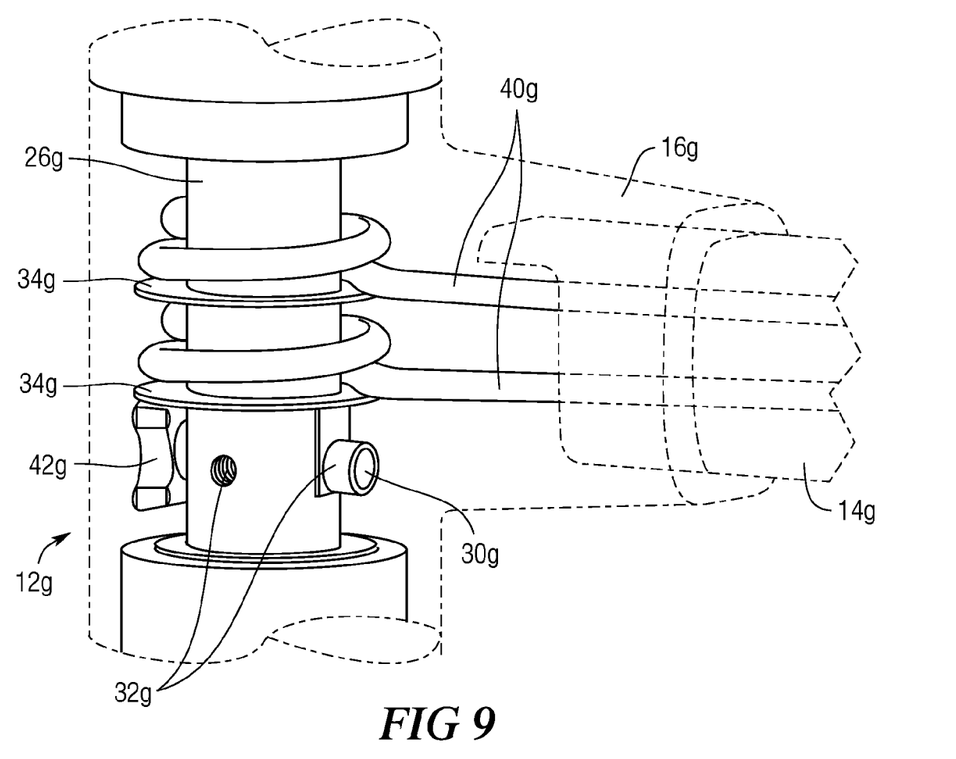
FIG. 9 is another embodiment of the central pivot pendant arm system, showing an interior side view of a shoulder casting utilizing a plurality of cabling, each being separated by a divider.

In some embodiments, multiple cablings 40g are required to be run through the pendant arms 14g of a central pivot pendant arm system. FIG. 9 depicts an embodiment in which multiple cables 40g are wrapped around the same shaft portion 26g. Each shaft portion 26g can be divided by two or more dividers 34g. Here, the top divider 34g separates the cabling 40g above it from the cabling 40g below it. The bottom divider 34g separates the cabling 40g above it from the cable stop 30g below it. In this embodiment, each cabling 40g has its own side opening (not shown). There can be as many dividers 34g, side openings (not shown), and cables 40g as space permits, based at least in part on the length of each shaft portion 26g and the size of each shoulder casting 12g.

Figure 10:
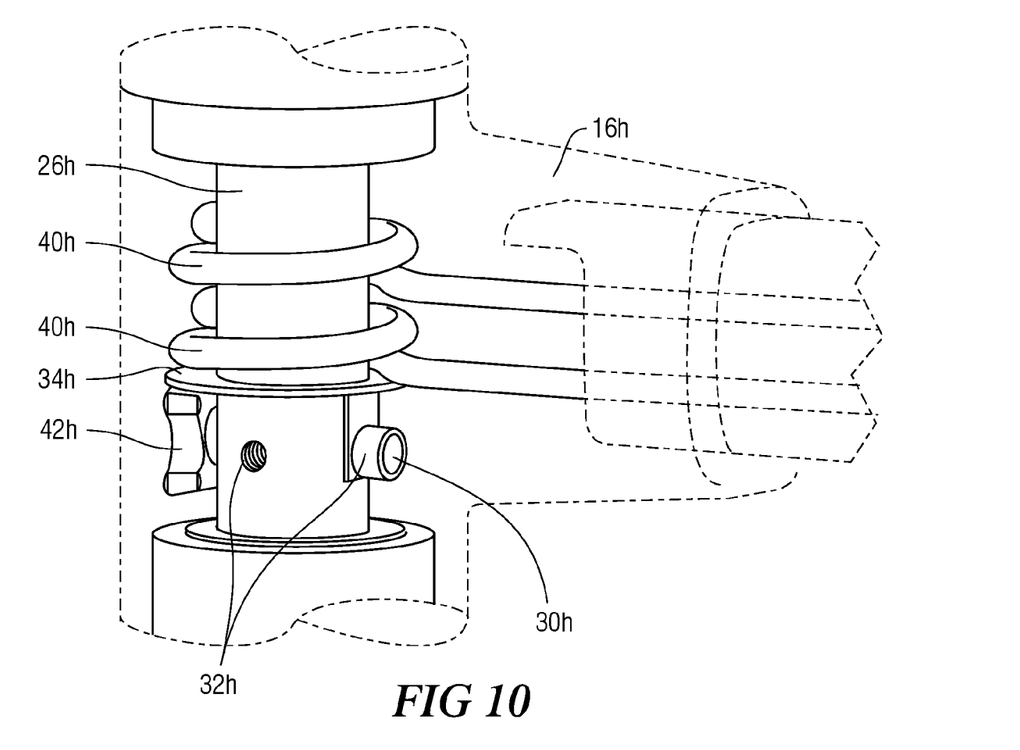
FIG. 10 is another embodiment of the central pivot pendant arm system, showing a close-up interior view of a shoulder casting running a plurality of cabling together that passes through the same side opening (not shown).

Other embodiments may utilize appropriately sized side openings to accommodate a plurality of cabling 40h passing through the same side opening. Additional dividers are thus not required, permitting the plurality of cabling 40h to be run together without separation. FIG. 10 depicts such an embodiment. Here, a shaft portion 26h is bisected by a single divider 34h that separates the plurality of cabling 40h above it from the cable stop 30h below it. The plurality of cabling 40h emerges together from a single side opening (not shown), wraps around the shaft portion 26h together, and runs together into the protrusion 16h without separation, having no separator between them.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A central pivot pendant arm system comprising:
   a shaft providing an axis of rotation and cabling access through a side opening, wherein a plurality of stop-attachment openings through said shaft each provide direct attachment of a stop onto said shaft with outward extension from said shaft;
   one or more shoulder castings pivotable about said axis of rotation and partially enclosing a portion of said shaft, said one or more shoulder castings comprising:
      a protrusion inside of which a pendant arm is attached; and
      cabling passage inside said one or more shoulder castings between said side opening and the pendant arm interior; and
   a connector located above or below a shoulder casting and partially enclosing a portion of said shaft;
   said shaft being mounted within said connector according to one of a plurality of positions; and
   said shaft extending less than the combined length of said one or more shoulder castings and said connector.

2. The central pivot pendant arm system of claim 1 further comprising a stop extending outward from one of said stop-attachment openings in said shaft blocking the path of rotation of a tab extending inward from said one or more shoulder castings.

3. The central pivot pendant arm system of claim 1 further comprising a divider radially extending from said shaft to said one or more shoulder castings.

4. The central pivot pendant arm system of claim 1 wherein the pendant arm is secured to said protrusion by a joining mechanism.

5. The central pivot pendant arm system of claim 1 wherein a slip ring inside said one or more shoulder castings is rotatable about said shaft and interfaces with the pendant arm.

6. The central pivot pendant arm system of claim 1 wherein said shaft is mounted within said connector, according to one of four quadrants about said axis of rotation.

7. The central pivot pendant arm system of claim 1 wherein said shaft provides cabling access through said side opening and a first opening.

8. The central pivot pendant arm system of claim 1 wherein said shaft provides cabling access through said side opening and an endpoint opening.

9. The central pivot pendant arm system of claim 1 wherein said protrusion comprises a removable cover.

10. The central pivot pendant arm system of claim 1 further comprising a plurality of stacked shoulder castings.

11. The central pivot pendant arm system of claim 1 wherein said shaft portion comprises a plurality of side openings separated by a divider radially extending from said shaft portion to a shoulder casting, wherein cabling can run between each of said plurality of side openings and the pendant arm interior.

12. The central pivot pendant arm system of claim 1 further comprising:
   a plurality of side openings on said shaft; and
   a plurality of stacked shoulder castings, each shoulder casting partially enclosing a portion of said shaft having one of said side openings.

13. The central pivot pendant arm system of claim 1 wherein said side opening provides cabling passage for a plurality of cabling to wrap around said shaft and proceed through said protrusion into the pendant arm.

14. The central pivot pendant arm system of claim 1 further comprising a plurality of stops extending outward from a corresponding number of said stop-attachment openings in said shaft blocking the path of rotation of a tab extending inward from a shoulder casting.

\* \* \* \* \*